United States Patent
Oshitari et al.

(10) Patent No.: US 10,164,241 B2
(45) Date of Patent: Dec. 25, 2018

(54) ELECTRODE MATERIAL FOR LITHIUM-ION RECHARGEABLE BATTERY AND METHOD FOR MANUFACTURING SAME

(71) Applicant: Sumitomo Osaka Cement Co., Ltd., Tokyo (JP)

(72) Inventors: Satoru Oshitari, Tokyo (JP); Masataka Oyama, Tokyo (JP); Ryuuta Yamaya, Tokyo (JP)

(73) Assignee: SUMITOMO OSAKA CEMENT CO., LTD., Tokyo (JP)

( * ) Notice: Subject to any disclaimer, the term of this patent is extended or adjusted under 35 U.S.C. 154(b) by 0 days.

(21) Appl. No.: 15/054,185

(22) Filed: Feb. 26, 2016

(65) Prior Publication Data

US 2017/0092933 A1 Mar. 30, 2017

(30) Foreign Application Priority Data

Sep. 30, 2015 (JP) ................. 2015-192991

(51) Int. Cl.
| | |
|---|---|
| H01M 4/136 | (2010.01) |
| H01M 4/1397 | (2010.01) |
| H01M 4/133 | (2010.01) |
| H01M 4/04 | (2006.01) |
| H01M 4/62 | (2006.01) |
| H01M 4/58 | (2010.01) |
| H01M 4/587 | (2010.01) |
| H01M 4/36 | (2006.01) |
| H01M 10/0525 | (2010.01) |
| H01M 4/02 | (2006.01) |

(52) U.S. Cl.
CPC ......... *H01M 4/136* (2013.01); *H01M 4/0402* (2013.01); *H01M 4/0419* (2013.01); *H01M 4/0471* (2013.01); *H01M 4/133* (2013.01); *H01M 4/1397* (2013.01); *H01M 4/366* (2013.01); *H01M 4/587* (2013.01); *H01M 4/5825* (2013.01); *H01M 4/625* (2013.01); *H01M 10/0525* (2013.01); *H01M 2004/028* (2013.01)

(58) Field of Classification Search
None
See application file for complete search history.

(56) References Cited

U.S. PATENT DOCUMENTS

| | | | |
|---|---|---|---|
| 2007/0082262 A1* | 4/2007 | Nishimura | H01M 4/13 429/217 |
| 2012/0183851 A1* | 7/2012 | Hara | H01M 4/136 429/211 |
| 2013/0108928 A1* | 5/2013 | Ito | H01M 4/131 429/231.1 |
| 2013/0130113 A1* | 5/2013 | Takano | H01M 4/131 429/223 |
| 2013/0140496 A1* | 6/2013 | Nuspl | C01B 25/45 252/507 |

FOREIGN PATENT DOCUMENTS

| | | | |
|---|---|---|---|
| EP | 2882015 A1 | 6/2015 | |
| JP | 2001015111 A | 1/2001 | |
| JP | 2004-359538 A | 12/2004 | |
| JP | 2004359538 A | * 12/2004 | |
| JP | 2011181452 A | 9/2011 | |
| JP | 2012204015 A | 10/2012 | |
| WO | WO 2013002730 A1 | * 1/2013 | ............ H01M 4/366 |

OTHER PUBLICATIONS

Search Report for European Patent Application No. 16155372.2 (dated Nov. 25, 2016).

* cited by examiner

*Primary Examiner* — Daniel S Gatewood
(74) *Attorney, Agent, or Firm* — Merchant & Gould P.C.

(57) ABSTRACT

An electrode material for a lithium-ion rechargeable battery of the present invention is an electrode material for a lithium-ion rechargeable battery formed by coating a surface of an electrode active material represented by General Formula $LiFe_xMn_{1-x-y}M_yPO_4$ (here, M represents at least one element selected from Mg, Ca, Co, Sr, Ba, Ti, Zn, B, Al, Ga, In, Si, Ge, and rare earth elements, $0.05 \leq x \leq 1.0$, $0 \leq y \leq 0.14$) with a carbonaceous film, in which an angle of repose is in a range of 35° or more and 50° or less.

5 Claims, No Drawings

ELECTRODE MATERIAL FOR LITHIUM-ION RECHARGEABLE BATTERY AND METHOD FOR MANUFACTURING SAME

CROSS-REFERENCE TO RELATED APPLICATIONS

This application claims the benefit of Japanese Patent Application No. 2015-192991 filed Sep. 30, 2015, the disclosure of which is herein incorporated by reference in its entirety.

BACKGROUND OF THE INVENTION

Field of the Invention

The present invention relates to an electrode material for a lithium-ion rechargeable battery and a method for manufacturing the same.

Description of Related Art $LiFe_xMn_{1-x-y}M_yPO_4$ which is an olivine-based electrode active material has insufficient electron conductivity. Therefore, in a lithium-ion rechargeable battery in which a phosphate-based electrode active material is used as a cathode active material, a variety of efforts are made for miniaturization of electrode active material particles, conjugation of an electrode active material and a conductive substance, and the like in order to charge and discharge a large amount of electric current (for example, refer to Patent Document 1).

However, the olivine-based electrode active material has a problem of low electron conductivity and low diffusivity of lithium. In addition, in a case in which the primary particle diameter of the olivine-based electrode active material is set to be equal to that of an oxide cathode (several micrometers), a high output which is required for electric vehicle use cannot be obtained. In order to reduce electron conductivity and the diffusion distance of lithium, studies are underway to miniaturize the primary particles of the olivine-based electrode active material. However, in order to obtain a high output, it is necessary to miniaturize the primary particle diameter of the olivine-based electrode active material to several hundred nanometers.

In the olivine-based electrode active material, in a case in which the primary particle diameter is miniaturized to several nanometers, the number of pores between primary particles is increased, and thus an electrode material having a sufficient powder density cannot be obtained. In an electrode produced using this electrode material, electrode material particles do not sufficiently come into contact with each other, and thus the electrode becomes less conductive, and a high output cannot be obtained.

Furthermore, in a case in which the primary particle diameter of the olivine-based electrode active material is miniaturized to several hundred nanometers, it is difficult to control the size of an agglomerate. Here, in a case in which an agglomerate is too small, the fluidity of the agglomerate significantly decreases, and, during the manufacturing of an electrode material, there is a case in which a transfer pipe is clogged. In addition, in order to bring an electrode active material in an electrode and a conductive substance into sufficient contact with each other, a large amount of the conductive substance becomes necessary, which is not preferable. In addition, in a case in which an agglomerate is too large, it is difficult to produce an ordinary electrode for a high-output battery for an electric vehicle which has a thickness of several tens of micrometers.

PRIOR ART DOCUMENTS

Patent Documents

Patent Document 1: Japanese Unexamined Patent Application, First Publication No. 2012-204015
Patent Document 2: Japanese Unexamined Patent Application, First Publication No. 2011-181452
Patent Document 3: Japanese Unexamined Patent Application, First Publication No. 2001-15111

SUMMARY OF THE INVENTION

The present invention has been made in consideration of the above-described circumstances, and an object of the present invention is to provide an electrode material for a lithium-ion rechargeable battery having improved dispersibility of an electrode active material and a conductive substance and improved adhesiveness and a method for manufacturing the same.

The present inventors and the like carried out intensive studies in order to achieve the above-described object, and consequently found that, in an electrode material for a lithium-ion rechargeable battery formed by coating the surface of an electrode active material represented by General Formula $LiFe_xMn_{1-x-y}M_yPO_4$ with a carbonaceous film, setting of the angle of repose in a predetermined range leads to the following fact, and completed the present invention. That is, the present inventors and the like found that the dispersibility and adhesiveness of an electrode active material and a conductive substance improve, and the output of a lithium-ion rechargeable battery can be increased.

An electrode material for a lithium-ion rechargeable battery of the present invention is an electrode material for a lithium-ion rechargeable battery formed by coating a surface of an electrode active material represented by General Formula $LiFe_xMn_{1-x-y}M_yPO_4$ (here, M represents at least one element selected from Mg, Ca, Co, Sr, Ba, Ti, Zn, B, Al, Ga, In, Si, Ge, and rare earth elements, $0.05 \leq x \leq 1.0$, $0 \leq y \leq 0.14$) with a carbonaceous film, in which an angle of repose is in a range of 35° or more and 50° or less.

A method for manufacturing an electrode material for a lithium-ion rechargeable battery of the present invention is a method for manufacturing an electrode material for a lithium-ion rechargeable battery formed by coating a surface of an electrode active material represented by General Formula $LiFe_xMn_{1-x-y}M_yPO_4$ (here, M represents at least one element selected from Mg, Ca, Co, Sr, Ba, Ti, Zn, B, Al, Ga, In, Si, Ge, and rare earth elements, $0.05 \leq x \leq 1.0$, $0 \leq y \leq 0.14$) with a carbonaceous film, including a step of preparing a mixture made up of the electrode active material, an aromatic organic compound as a first carbon source material, and an organic compound which has a weight-average molecular weight of 500 or less and does not include any aromatic groups as a second carbon source material, a step of obtaining an agglomerate by spraying and drying the mixture, and a step of calcinating the agglomerate, in which an electrode material for a lithium-ion rechargeable battery having an angle of repose in a range of 35° or more and 50° or less is generated.

According to the electrode material for a lithium-ion rechargeable battery of the present invention, since the dispersibility and adhesiveness of an electrode active material and a conductive substance are high, it is possible to realize a high-output lithium-ion rechargeable battery.

According to the method for manufacturing an electrode material for a lithium-ion rechargeable battery of the present invention, it is possible to obtain an electrode material for a lithium-ion rechargeable battery having high dispersibility and high adhesiveness of an electrode active material and a conductive substance.

DETAILED DESCRIPTION OF THE INVENTION

An embodiment of the electrode material for a lithium-ion rechargeable battery of the present invention and the method for manufacturing the same will be described.

Meanwhile, the present embodiment is a specific description for easier understanding of the gist of the present invention and, unless particularly otherwise described, does not limit the present invention.

Electrode Material for Lithium-Ion Rechargeable Battery

An electrode material for a lithium-ion rechargeable battery of the present embodiment is an electrode material for a lithium-ion rechargeable battery formed by coating a surface of an electrode active material represented by General Formula $LiFe_xMn_{1-x-y}M_yPO_4$ (here, M represents at least one element selected from Mg, Ca, Co, Sr, Ba, Ti, Zn, B, Al, Ga, In, Si, Ge, and rare earth elements, $0.05 \leq x \leq 1.0$, $0 \leq y \leq 0.14$) with a carbonaceous film, in which an angle of repose is in a range of 35° or more and 50° or less.

The electrode material for a lithium-ion rechargeable battery of the present embodiment is mainly used as a cathode material for a lithium-ion rechargeable battery.

The angle of repose in the electrode material for a lithium-ion rechargeable battery of the present embodiment refers to the steepest angle of an inclined surface at which the electrode material for a lithium-ion rechargeable battery of the present embodiment is stably maintained with no voluntary collapse when being piled. The angle of repose is determined by the secondary particle diameter of the electrode material for a lithium-ion rechargeable battery of the present embodiment and the particle size distribution, the agglomeration state, and the shape of secondary particles.

The electrode material for a lithium-ion rechargeable battery of the present embodiment is formed by coating the surfaces of the primary particles of an electrode active material made of $LiFe_xMn_{1-x-y}M_yPO_4$.

The average primary particle diameter of the primary particles of the electrode active material made of $LiFe_xMn_{1-x-y}M_yPO_4$ is preferably in a range of 30 nm or more and 500 nm or less and more preferably in a range of 50 nm or more and 400 nm or less.

Here, the reason for setting the average primary particle diameter of $LiFe_xMn_{1-x-y}M_yPO_4$ particles in the above-described range is as described below. When the average primary particle diameter of the $LiFe_xMn_{1-x-y}M_yPO_4$ particles is less than 30 nm, the particles are too small, and it becomes difficult to favorably maintain the crystallinity. As a result, it becomes impossible to obtain $LiFe_xMn_{1-x-y}M_yPO_4$ particles in which the length of the crystal lattice of the $LiFe_xMn_{1-x-y}M_yPO_4$ particles in a b axial direction is specifically shortened while maintaining the lengths of the crystal lattice in an a axial direction and a c axial direction to be large. On the other hand, when the average primary particle diameter of the $LiFe_xMn_{1-x-y}M_yPO_4$ particles exceeds 500 nm, the $LiFe_xMn_{1-x-y}M_yPO_4$ particles are not sufficiently miniaturized, and consequently, extremely small $LiFe_xMn_{1-x-y}M_yPO_4$ particles having favorable crystallinity cannot be obtained.

When the cumulative volume percentage of the particle size distribution of secondary particles which are agglomerates of particles formed by coating the surfaces of the primary particles of an electrode active material with a carbonaceous film is 10%, the particle diameter (D10) is preferably in a range of 1 μm or more and 3 μm or less and more preferably in a range of 1.1 μm or more and 2 μm or less. In addition, when the cumulative volume percentage of the particle size distribution of the secondary particles is 90%, the particle diameter (D90) is preferably in a range of 6 μm or more and 18 μm or less and more preferably in a range of 7 μm or more and 15 μm or less.

Here, the reason for setting the particle diameter (D10) obtained when the cumulative volume percentage of the particle size distribution of the secondary particles is 10% in the above-described range is as described below. When the particle diameter (D10) obtained when the cumulative volume percentage of the particle size distribution of the secondary particles is 10% is less than 1 μm, it becomes difficult to handle powder, and there is a problem with the manufacturing of an electrode, which is not preferable. On the other hand, when the particle diameter (D10) obtained when the cumulative volume percentage of the particle size distribution of the secondary particles is 10% exceeds 3 μm, the width of the particle size distribution of the secondary particles becomes too sharp, and thus it becomes difficult for the secondary particles to be densely packed, and the packing density decreases, which is not preferable.

The reason for setting the particle diameter (D90) obtained when the cumulative volume percentage of the particle size distribution of the secondary particles is 90% in the above-described range is as described below. When the particle diameter (D90) obtained when the cumulative volume percentage of the particle size distribution of the secondary particles is 90% is less than 6 μm, it becomes difficult to handle powder, and there is a problem with the manufacturing of an electrode, which is not preferable. On the other hand, when the particle diameter (D90) obtained when the cumulative volume percentage of the particle size distribution of the secondary particles is 90% exceeds 18 μm, the size of the secondary particles becomes large relative to the thickness of an electrode coating, and the surface of an electrode is likely to be uneven, which is not preferable.

The thickness of the carbonaceous film is preferably in a range of 1 nm or more and 5 nm or less.

The reason for setting the thickness of the carbonaceous film in the above-described range is as described below. When the thickness of the carbonaceous film is less than 1 nm, the thickness of the carbonaceous film is too thin, and it becomes impossible to form a film having a desired resistance value. As a result, the conductivity decreases, and it becomes impossible to ensure conductivity suitable for an electrode material. On the other hand, when the thickness of the carbonaceous film exceeds 5 nm, battery activity, for example, the battery capacity of the electrode material per unit mass, decreases.

The average primary particle diameter of the primary particles of the electrode active material made of $LiFe_xMn_{1-x-y}M_yPO_4$ which are coated with the carbonaceous film is preferably in a range of 40 nm or more and 530 nm or less and more preferably in a range of 60 nm or more and 350 nm or less.

Here, the reason for setting the average primary particle diameter of the primary particles of the electrode active material made of $LiFe_xMn_{1-x-y}M_yPO_4$ which are coated with the carbonaceous film in the above-described range is as described below. When the average primary particle diameter is less than 40 nm, the specific surface area of carbonaceous electrode active material composite particles is increased, and thus the mass of required carbon is increased, and the charge and discharge capacity is decreased. Furthermore, carbon coating becomes difficult, it is not possible to obtain primary particles having a sufficient coating ratio, and particularly, a favorable mass energy density cannot be obtained at a low temperature or at a high-speed charge and discharge. On the other hand, when the average primary particle diameter exceeds 350 nm, it takes time for lithium ions or electrons to migrate among the carbonaceous electrode active material composite particles, and thus internal resistance increases, and output characteristics deteriorate, which is not preferable.

The shape of the primary particle of the electrode active material made of $LiFe_xMn_{1-x-y}M_yPO_4$ which is coated with the carbonaceous film is not particularly limited, but is preferably a spherical shape since it is easy to generate an electrode material made of spherical particles, particularly, truly spherical particles.

Here, the reason for the shape being preferably a spherical shape is as described below. It is possible to decrease the amount of a solvent when the primary particles of the electrode active material which are coated with the carbonaceous film, a binding agent, and the solvent are mixed together so as to prepare a paste for the electrode material for a lithium-ion rechargeable battery. Furthermore, it becomes easy to apply the paste for the electrode material for a lithium-ion rechargeable battery to a current collector. In addition, when the shape of the primary particle is a spherical shape, the surface area of the primary particles of the electrode active material is minimized, furthermore, it is possible to minimize the mixing amount of the binding agent added, and the internal resistance of the obtained electrode can be decreased.

Furthermore, when the shape of the primary particle of the electrode active material is set to be a spherical shape, particularly, a truly spherical shape, it becomes easy to closely pack the primary particles. In such a case, the amount of the electrode material for a lithium-ion rechargeable battery packed per unit volume increases, consequently, an electrode density can be increased, and it is possible to increase the capacity of the lithium-ion battery, which is preferable.

The amount of carbon included in the electrode material for a lithium-ion rechargeable battery of the present embodiment is preferably in a range of 1.5% by mass or more and 7% by mass or less and more preferably in a range of 2% by mass or more and 6% by mass or less.

Here, the reason for limiting the amount of carbon included in the electrode material for a lithium-ion rechargeable battery of the present embodiment in the above-described range is as described below. When the amount of carbon is less than 1.5% by mass, the discharge capacity at a high charge-discharge rate is decreased in a case in which a battery is formed, and it becomes difficult to realize sufficient charge and discharge rate performance. On the other hand, when the amount of carbon exceeds 7% by mass, the amount of carbon is too large, and the battery capacity of a lithium-ion battery per unit mass of the primary particles of the electrode active material is decreased more than necessary.

In addition, the carbon supporting amount relative to the specific surface area of the primary particles of the electrode active material ([the carbon supporting amount]/[the specific surface area of the primary particles of the electrode active material]) is preferably in a range of 0.65 or more and 1.1 or less and more preferably in a range of 0.7 or more and 1.05 or less.

Here, the reason for limiting the carbon supporting amount in the electrode material for a lithium-ion rechargeable battery of the present embodiment in the above-described range is as described below. When the carbon supporting amount is less than 0.65, the discharge capacity at a high charge-discharge rate is decreased in a case in which a battery is formed, and it becomes difficult to realize sufficient charge and discharge rate performance. On the other hand, when the carbon supporting amount exceeds 1.1, the amount of carbon is too large, and the battery capacity of a lithium-ion battery per unit mass of the primary particles of the electrode active material is decreased more than necessary.

The specific surface area of the electrode material for a lithium-ion rechargeable battery of the present embodiment is preferably in a range of 7 $m^2/g$ or more and 16 $m^2/g$ or less and more preferably in a range of 8 $m^2/g$ or more and 14 $m^2/g$ or less.

Here, the reason for limiting the specific surface area of the electrode material for a lithium-ion rechargeable battery of the present embodiment in the above-described range is as described below. When the specific surface area is less than 7 $m^2/g$, it takes time for lithium ions or electrons to migrate among the carbonaceous electrode active material composite particles, and thus internal resistance increases, and output characteristics deteriorate, which is not preferable. On the other hand, the specific surface area exceeds 16 $m^2/g$, the specific surface area of the carbonaceous electrode active material composite particles is increased, and thus the mass of required carbon is increased, and the charge and discharge capacity is decreased, which is not preferable.

In the electrode material for a lithium-ion rechargeable battery of the present embodiment, the angle of repose is preferably in a range of 35° or more and 50° or less and more preferably in a range of 38° or more and 50° or less.

Here, the reason for limiting the angle of repose of the electrode material for a lithium-ion rechargeable battery of the present embodiment in the above-described range is as described below. When the angle of repose is less than 35°, it is expected that a decrease in the surface roughness of the electrode material weakens joining between the electrode material and a conducting agent, and a decrease in electron conductivity between the electrode material and the conducting agent decreases the battery output, which is not preferable. On the other hand, when the angle of repose exceeds 50°, the fluidity of the electrode material is significantly decreased, and thus uniform dispersion of the electrode material and the conducting agent becomes difficult, and the battery output does not only decreases, but there is also a problem with handling due to clogging of a pipe by powder, which is not preferable.

Electrode Active Material

The electrode active material is made of $LiFe_xMn_{1-x-y}M_yPO_4$ (here, M represents at least one element selected from Mg, Ca, Co, Sr, Ba, Ti, Zn, B, Al, Ga, In, Si, Ge, and rare earth elements, $0.05 \leq x \leq 1.0$, $0 \leq y \leq 0.14$) having a crystal structure preferable for Li diffusion.

In $LiFe_xMn_{1-x-y}M_yPO_4$, the reason for setting x to satisfy $0.05 \leq x \leq 1.0$ is as described below. Since Fe develops a charge and discharge capacity at a voltage of near 3.5 V, a decrease in the energy density caused by formation of a solid solution is milder than that of Co or Zn, and thus a relatively large amount of Fe has been set to be available for formation of a solid solution so that an improvement of low-temperature characteristics is expected while the energy density is not excessively decreased. Furthermore, Fe is a carbonization catalyst element and, when forming a Fe solid solution, improves the coating properties of the carbonaceous film and thus enables an improvement of output characteristics or low-temperature characteristics. Therefore, the amount of a solid solution at which a sufficient carbonization catalyst action can be developed has been set as a solid solution range.

The reason for setting y to satisfy $0 \leq y \leq 0.14$ is as described below. Co or Zn is an electrochemical inert element in a voltage range of 1.0 V to 4.3 V and has a strong effect of improving electron conductivity, Li diffusivity, and the activation energy for an intercalation and deintercalation reaction of a lithium ion (Li+). However, a large amount of a solid solution formed significantly decreases the charge and discharge capacity and the energy density, and thus a relatively small amount of Co or Zn at which low-temperature characteristics can be sufficiently improved while the energy density is not excessively decreased has been set to be allowed to form a solid solution.

In $LiFe_xMn_{1-x-y}M_yPO_4$, M is an electrochemical inert element in a voltage range of 1.0 V to 4.3 V. The electrochemical inert element in a voltage range of 1.0 V to 4.3 V is, specifically, preferably an element which constitutes a lithium-ion rechargeable battery and, even in a case in which the voltage is changed in a range of 1.0 V to 4.3 V, does not contribute to development of the charge and discharge capacity while maintaining the valence of the element unchanged so as to be divalent.

Examples of the M include at least one element selected from Mg, Ca, Co, Sr, Ba, Ti, Zn, B, Al, Ga, In, Si, Ge, and rare earth elements. That is, as M, the above-described elements may be singly used or a combination (mixture) of two or more elements may be used.

In $LiFe_xMn_{1-x-y}M_yPO_4$ in the present embodiment, M is preferably Mg or Co and more preferably a mixture of Mg and Co. In a case in which M is a mixture of Mg and Co, the y preferably satisfies $0.01 \leq y \leq 0.075$ and more preferably satisfies $0.03 \leq y \leq 0.06$.

In the electrode material for a lithium-ion rechargeable battery of the present embodiment, the discharge capacity of $LiFe_xMn_{1-x-y}M_yPO_4$ at an electric current density of 3 CA, which is measured at 25° C., is preferably 130 mAh/g or more and more preferably 135 mAh/g or more.

Here, the reason for setting the discharge capacity in the above-described range is as described below. When the discharge capacity is less than 130 mAh/g, the output of the battery becomes insufficient, and the battery becomes inappropriate for a high-output battery.

Meanwhile, the discharge capacity (mAh/g) of $LiFe_xMn_{1-x-y}M_yPO_4$ at an electric current density of 3 CA is measured using a method described in the following examples.

[Method for Manufacturing Electrode Material for Lithium-Ion Rechargeable Battery]

A method for manufacturing an electrode material for a lithium-ion rechargeable battery of the present embodiment is not particularly limited, and examples thereof include a method including a step of synthesizing $LiFe_xMn_{1-x-y}M_yPO_4$ particles under pressure by heating raw material slurry α obtained by mixing a Li source, a Fe source, an Mn source, a P source, and an M source with a solvent including water as a main component to a temperature in a range of 150° C. or more and 230° C. or less and a step of coating the surfaces of the $LiFe_xMn_{1-x-y}M_yPO_4$ particles (primary particles) with a carbonaceous film by drying raw material slurry β formed by dispersing the $LiFe_xMn_{1-x-y}M_yPO_4$ particles in a water solvent including a carbon source so as to granulate the particles and heating the particles to a temperature in a range of 550° C. or more and 830° C. or less.

The method for synthesizing the $LiFe_xMn_{1-x-y}M_yPO_4$ particles is not particularly limited, and, for example, a Li source, a Fe source, an Mn source, a P source, and an M (at least one element selected from Mg, Ca, Co, Sr, Ba, Ti, Zn, B, Al, Ga, In, Si, Ge, and rare earth elements) source are injected into a solvent including water as a main component and stirred, thereby preparing raw material slurry α including the precursor of $LiFe_xMn_{1-x-y}M_yPO_4$.

The Li source, the Fe source, the Mn source, the P source, and the M source are injected into a solvent including water as a main component so that the molar ratio therebetween (the Li source:the Fe source:the Mn source:the P source:the M source), that is, the molar ratio of Li:Fe:Mn:P:M reaches 2 to 3.5:0.05 to 1:0 to 1:0 to 0.95:0.95 to 1.07:0 to 0.14, and are stirred and mixed, thereby preparing the raw material slurry α.

The Li source, the Fe source, the Mn source, the P source, and the M source are preferably, first, put into an aqueous solution state respectively and then are mixed together in order to uniformly mix the Li source, the Fe source, the Mn source, the P source, and the M source.

The molar concentration of the Li source, the Fe source, the Mn source, the P source, and the M source in the raw material slurry α is preferably in a range of 1 mol/L or more and 4 mol/L or less since it is necessary to obtain extremely small $LiFe_xMn_{1-x-y}M_yPO_4$ particles having a high purity and high crystallinity.

Examples of the Li source include hydroxides such as lithium hydroxide (LiOH), inorganic lithium acid salts such as lithium carbonate ($Li_2CO_3$), lithium chloride (LiCl), lithium nitrate ($LiNO_3$), lithium phosphate ($Li_3PO_4$), lithium hydrogen phosphate ($Li_2HPO_4$), and lithium dihydrogen phosphate ($LiH_2PO_4$), organic lithium acid salts such as lithium acetate ($LiCH_3COO$) and lithium oxalate (($COOLi)_2$), and hydrates thereof. As the Li source, at least one compound selected from the above-described group is preferably used.

Meanwhile, lithium phosphate ($Li_3PO_4$) can also be used as the Li source and the P source.

As the Fe source, iron compounds such as iron (II) chloride ($FeCl_2$), iron (II) sulfate ($FeSO_4$), and iron (II) acetate ($Fe(CH_3COO)_2$) or hydrates thereof, trivalent iron compounds such as iron (III) nitrate ($Fe(NO_3)_3$), iron (III) chloride ($FeCl_3$), and iron (III) citrate ($FeC_6H_5O_7$), lithium iron phosphate, or the like can be used.

The Mn source is preferably an Mn salt, and examples thereof include manganese (II) chloride ($MnCl_2$), manganese (II) sulfate ($MnSO_4$), manganese (II) nitrate ($Mn(NO_3)_2$), manganese (II) acetate ($Mn(CH_3COO)_2$), and hydrates thereof. As the Mn source, at least one compound selected from the above-described group is preferably used.

As the P source, for example, at least one compound selected from phosphoric acids such as orthophosphonic acid ($H_3PO_4$) and metaphosphoric acid ($HPO_3$), phosphoric salts such as ammonium dihydrogen phosphate ($NH_4H_2PO_4$), diammonium phosphate (($NH_4)_2HPO_4$), ammonium phosphate (($NH_4)_3PO_4$), lithium phosphate ($Li_3PO_4$), lithium hydrogen phosphate ($Li_2HPO_4$), and lithium dihydrogen phosphate ($LiH_2PO_4$), and hydrates thereof is preferably used.

An Mg source is preferably an Mg salt, and examples thereof include magnesium (II) chloride ($MgCl_2$), magnesium (II) sulfate ($MgSO_4$), magnesium (II) nitrate ($Mg(NO_3)_2$), magnesium (II) acetate ($Mg(CH_3COO)_2$), and hydrates thereof. As the Mg source, at least one compound selected from the above-described group is preferably used.

A Ca source is preferably a Ca salt, and examples thereof include calcium (II) chloride ($CaCl_2$), calcium (II) sulfate ($CaSO_4$), calcium (II) nitrate ($Ca(NO_3)_2$), calcium (II) acetate ($Ca(CH_3COO)_2$), and hydrates thereof. As the Ca source, at least one compound selected from the above-described group is preferably used.

A Co source is preferably a Co salt, and examples thereof include cobalt (II) chloride ($CoCl_2$), cobalt (II) sulfate ($CoSO_4$), cobalt (II) nitrate ($Co(NO_3)_2$), cobalt (II) acetate ($Co(CH_3COO)_2$), and hydrates thereof. As the Co source, at least one compound selected from the above-described group is preferably used.

An Sr source is preferably an Sr salt, and examples thereof include strontium carbonate ($SrCo_3$), strontium sulfate ($SrSO_4$), and strontium hydroxide ($Sr(OH_2)$), and at least one compound selected from a group made up of the above-described compounds is preferably used.

A Ba source is preferably a Ba salt, and examples thereof include barium (II) chloride ($BaCl_2$), barium (II) sulfate ($BaSO_4$), barium (II) nitrate ($Ba(NO_3)_2$), barium (II) acetate ($Ba(CH_3COO)_2$), and hydrates thereof, and at least one compound selected from a group made up of the above-described compounds is preferably used.

A Ti source is preferably a Ti salt, and examples thereof include titanium chlorides ($TiCl_4$, $TiCl_3$, and $TiCl_2$), titanium oxide (TiO), and hydrates thereof, and at least one compound selected from a group made up of the above-described compounds is preferably used.

A Zn source is preferably a Zn salt, and examples thereof include zinc (II) chloride ($ZnCl_2$), zinc (II) sulfate ($ZnSO_4$), zinc (II) nitrate ($Zn(NO_3)_2$), zinc (II) acetate ($Zn(CH_3COO)_2$), and hydrates thereof. As the Zn source, at least one compound selected from a group made up of the above-described compounds is preferably used.

Examples of a B source include boron compounds such as chlorides, sulfoxides, nitroxides, acetoxides, hydroxides, and oxides, and at least one compound selected from a group made up of the above-described compounds is preferably used.

Examples of an Al source include aluminum compounds such as chlorides, sulfoxides, nitroxides, acetoxides, and hydroxides, and at least one compound selected from a group made up of the above-described compounds is preferably used.

Examples of a Ga source include gallium compounds such as chlorides, sulfoxides, nitroxides, acetoxides, and hydroxides, and at least one compound selected from a group made up of the above-described compounds is preferably used.

Examples of an In source include indium compounds such as chlorides, sulfoxides, nitroxides, acetoxides, and hydroxides, and at least one compound selected from a group made up of the above-described compounds is preferably used.

Examples of an Si source include sodium silicate, potassium silicate, silicon tetrachloride ($SiCl_4$), silicate salts, organic silicon compounds, and the like, and at least one compound selected from a group made up of the above-described compounds is preferably used.

Examples of a Ge source include germanium compounds such as chlorides, sulfoxides, nitroxides, acetoxides, and hydroxides, and at least one compound selected from a group made up of the above-described compounds is preferably used.

Examples of the rare earth elements include chlorides, sulfoxides, nitroxides, acetoxides, hydroxides, oxides, and the like of Sc, Y, La, Ce, Pr, Nd, Pm, Sm, Eu, Gd, Tb, Dy, Ho, Er, Tm, Yb, and Lu, and at least one compound selected from a group made up of the above-described compounds is preferably used.

The solvent including water as a main component is any one of water and water-based solvents which mainly include water and include an aqueous solvent such as an alcohol as necessary.

The aqueous solvent is not particularly limited as long as the solvent is capable of dissolving the Li source, the Fe source, the Mn source, the P source, and the M source. Examples thereof include alcohols such as methanol, ethanol, 1-propanol, 2-propanol (isopropyl alcohol: IPA), butanol, pentanol, hexanol, octanol, and diacetone alcohol, esters such as ethyl acetate, butyl acetate, ethyl lactate, propylene glycol monomethyl ether acetate, propylene glycol monoethyl ether acetate, and γ-butyrolactone, ethers such as diethyl ether, ethylene glycol monomethyl ether (methyl cellosolve), ethylene glycol monoethyl ether (ethyl cellosolve), ethylene glycol monobutyl ether (butyl cellosolve), diethylene glycol monomethyl ether, and diethylene glycol monoethyl ether, ketones such as acetone, methyl ethyl ketone (MEK), methyl isobutyl ketone (MIBK), acetyl acetone, and cyclohexanone, amides such as dimethyl formamide, N,N-dimethylacetoacetamide, and N-methyl pyrrolidone, glycols such as ethylene glycol, diethylene glycol, and propylene glycol, and the like. These aqueous solvents may be singly used or a mixture of two or more aqueous solvents may be used.

Carbon Source

The carbon source is not limited as long as the carbon source is an organic compound capable of forming a carbonaceous film having an angle of repose in a range of 35° or more and 50° or less; however, particularly, an aromatic organic compound as a first carbon source material and an organic compound which has a weight-average molecular weight of 500 or less and does not include any aromatic groups as a second carbon source material are preferably used.

The aromatic organic compound is preferably a compound which is soluble in water and dispersible in water. Examples thereof include salicylic acid, catechol, hydroquinone, resorcinol, pyrogallol, phloroglucinol, hexahydroxybenzene, benzoic acid, phthalic acid, terephthalic acid, phenylalanine, water-dispersible phenyl resins, and the like.

The organic compound which has a weight-average molecular weight of 500 or less and does not include any aromatic groups is preferably a compound which is soluble in water and generates carbon when being thermally treated in a non-oxidative atmosphere. Examples thereof include sugars such as sucrose, glucose, and lactose, carboxylic acids such as malic acid and citric acid, unsaturated monovalent alcohols such as allyl alcohol and propargyl alcohol, ascorbic acid, and the like.

It is assumed that, out of carbon supported by the primary particles of the electrode active material, a large amount of carbon having high crystallinity is derived from the aromatic organic compound, and a large amount of carbon that is almost amorphous is derived from the organic compound which has a weight-average molecular weight of 500 or less and does not include any aromatic groups.

In a case in which a large amount of carbon having high crystallinity is generated on the surfaces of the primary particles of the electrode active material, it is assumed that a decrease in the friction coefficient leads to a decrease in the angle of repose. Meanwhile, in a case in which a large amount of amorphous carbon is generated on the surfaces of the primary particles of the electrode active material, it is assumed that an increase in the friction coefficient leads to an increase in the angle of repose. In addition, in a carbonaceous film in which crystalline carbon and amorphous carbon are mixed with each other, it is assumed that the crystalline carbon forms protrusion portions on the surface of the carbonaceous film, and the fluidity of electrons is decreased, and thus the angle of repose is increased. The present inventors and the like have adjusted the angle of repose by preparing crystalline carbon and amorphous carbon in the carbonaceous film on the surfaces of the primary particles of the electrode active material.

In addition, in a case in which migration of electrons and Li on the surface of the electrode material is taken into account, when a large amount of crystalline carbon is generated, the volume resistance becomes a small value, and migration of electrons becomes easy. However, it is assumed that Li is not capable of migrating in a layer of the crystalline carbon, and migration of Li toward the surface of the electrode material from an electrolytic solution is hindered. Meanwhile, when a large amount of amorphous carbon is generated, the volume resistance becomes a large value, and migration of electrons becomes difficult. However, it is assumed that Li becomes capable of migrating through amorphous voids among the carbon, and migration of Li toward the surface of the electrode material from an electrolytic solution is facilitated.

Next, this raw material slurry α is put into a pressure resistant vessel, is heated to a temperature in a range of 150° C. or more and 230° C. or less and preferably in a range of 170° C. or more and 200° C. or less, and is hydrothermally treated for one hour to 72 hours, thereby obtaining $LiFe_xMn_{1-x-y}M_yPO_4$ particles.

The pressure in the pressure resistant vessel reaches, for example, a pressure in a range of 0.1 MPa or more and 2 MPa or less when the raw material slurry reaches the temperature in a range of 150° C. or more and 230° C. or less.

In this case, it is possible to control the particle diameter of the $LiFe_xMn_{1-x-y}M_yPO_4$ particles to a desired size by adjusting the temperature and duration of the hydrothermal treatment.

Next, the $LiFe_xMn_{1-x-y}M_yPO_4$ particles are dispersed in the water solvent including the carbon source, thereby preparing raw material slurry β.

Next, this raw material slurry β is dried so as to be granulated, and then is heated at a temperature in a range of 550° C. or more and 830° C. or less for one hour to 36 hours, and the surfaces of the $LiFe_xMn_{1-x-y}M_yPO_4$ particles (primary particles) with the carbonaceous film, thereby obtaining a cathode material for a lithium-ion rechargeable battery of the present embodiment.

In the method for manufacturing an electrode material for a lithium-ion rechargeable battery of the present embodiment, in a case in which the total mass of the electrode active material and the carbon source is set to 100% by mass, the additive amount (additive rate) of the carbon source is preferably in a range of 0.5% by mass or more and 10% by mass or less and more preferably in a range of 1% by mass or more and 6% by mass or less.

When the additive amount of the carbon source is less than 0.5% by mass, mixing stability in the electrode material for a lithium-ion rechargeable battery degrades, which is not preferable. On the other hand, when the additive amount of the carbon source exceeds 10% by mass, the content of the electrode active material becomes relatively small, and battery characteristics degrade, which is not preferable.

Electrode for Lithium-Ion Rechargeable Battery

An electrode for a lithium-ion rechargeable battery of the present embodiment includes an electrode current collector and an electrode mixture layer (electrode) formed on the electrode current collector, and the electrode mixture layer includes the electrode material for a lithium-ion rechargeable battery of the present embodiment.

That is, the electrode for a lithium-ion rechargeable battery of the present embodiment is obtained by forming the electrode mixture layer on one main surface of the electrode current collector using the electrode material for a lithium-ion rechargeable battery of the present embodiment.

The electrode for a lithium-ion rechargeable battery of the present embodiment is mainly used as a cathode for a lithium-ion rechargeable battery.

A method for manufacturing an electrode for a lithium-ion rechargeable battery of the present embodiment is not particularly limited as long as an electrode can be formed on one main surface of an electrode current collector using the electrode material for a lithium-ion rechargeable battery of the present embodiment. Examples of the method for manufacturing an electrode material for a lithium-ion rechargeable battery of the present embodiment include the following method.

First, a paste of an electrode material for a lithium-ion rechargeable battery is prepared by mixing the electrode material for a lithium-ion rechargeable battery of the present embodiment, a binding agent, a conductive auxiliary agent, and a solvent.

Binding Agent

The binding agent is not particularly limited as long as the binding agent can be used in a water system. Examples thereof include at least one binding agent selected from a group of polyethylene, polypropylene, polyethylene terephthalate, polymethyl methacrylate, vinyl acetate copolymers, styrene/butadiene-based latexes, acrylic latexes, acrylonitrile/butadiene-based latexes, fluorine-based latexes, silicon-based latexes, and the like.

When the total mass of the electrode material for a lithium-ion rechargeable battery of the present embodiment, the binding agent, and the conductive auxiliary agent is set to 100% by mass, the content rate of the binding agent in the paste of an electrode material for a lithium-ion rechargeable battery is preferably in a range of 1% by mass or more and 10% by mass or less and more preferably in a range of 2% by mass or more and 6% by mass or less.

Conductive Auxiliary Agent

The conductive auxiliary agent is not particularly limited, and, for example, at least one conductive auxiliary agent selected from a group of fibrous carbon such as acetylene black, Ketjen black, furnace black, vapor grown carbon fiber (VGCF), and carbon nanotube.

When the total mass of the electrode material for a lithium-ion rechargeable battery of the present embodiment, the binding agent, and the conductive auxiliary agent is set to 100% by mass, the content rate of the conductive auxiliary agent in the paste of an electrode material for a lithium-ion rechargeable battery is preferably in a range of 1% by mass or more and 15% by mass or less and more preferably in a range of 3% by mass or more and 10% by mass or less.

Solvent

To the paste of an electrode material for a lithium-ion rechargeable battery including the cathode material for a lithium-ion rechargeable battery of the present embodiment, a solvent may be appropriately added in order to facilitate coating of an article to be coated such as a current collector.

The main solvent is water, but may include a water-based solvent such as an alcohol, a glycol, or an ether as long as the characteristics of the cathode material for a lithium-ion rechargeable battery of the present embodiment are not lost.

When the total mass of the electrode material for a lithium-ion rechargeable battery of the present embodiment, the binding agent, and the conductive auxiliary agent is set to 100% by mass, the content rate of the solvent in the paste of an electrode material for a lithium-ion rechargeable battery is preferably in a range of 80% by mass or more and 300% by mass or less and more preferably in a range of 100% by mass or more and 250% by mass or less.

When the content rate of the solvent is in the above-described range, it is possible to obtain a paste of an electrode material for a lithium-ion rechargeable battery having excellent electrode formability and excellent battery characteristics.

A method for mixing the cathode material for a lithium-ion rechargeable battery of the present embodiment, the binding agent, the conductive auxiliary agent, and the solvent is not particularly limited as long as it is possible to uniformly mix the above-described components. Examples thereof include methods in which a kneader such as a ball mill, a sand mill, a planetary mixer, a paint shaker, or a homogenizer is used.

Next, the paste of an electrode material for a lithium-ion rechargeable battery is applied to one main surface of the electrode current collector so as to form a coating, and the coating is dried and then pressed under pressure, whereby it is possible to obtain an electrode for a lithium-ion rechargeable battery including the electrode mixture layer formed on one main surface of the electrode current collector.

Lithium-Ion Rechargeable Battery

A lithium-ion rechargeable battery of the present embodiment includes the electrode (cathode) for a lithium-ion rechargeable battery of the present embodiment, an anode, a separator, and an electrolytic solution.

In the lithium-ion rechargeable battery of the present embodiment, the anode, the electrolytic solution, the separator, and the like are not particularly limited.

As the anode, it is possible to use, for example, an anode material such as metallic Li, a carbon material, a Li alloy, or $Li_4Ti_5O_{12}$.

In addition, a solid electrolyte may be used instead of the electrolytic solution and the separator.

The electrolytic solution can be produced by, for example, mixing ethylene carbonate (EC) and ethyl methyl carbonate (EMC) so that the volume ratio therebetween reaches 1:1, and dissolving lithium hexafluorophosphate ($LiPF_6$) in the obtained solvent mixture so that the concentration thereof reaches, for example, 1 mol/dm$^3$.

As the separator, it is possible to use, for example, porous propylene.

In the lithium-ion rechargeable battery of the present embodiment, since the electrode for a lithium-ion rechargeable battery of the present embodiment is used as the cathode, the lithium-ion rechargeable battery has a high capacity and a high energy density.

As described above, according to the electrode material for a lithium-ion rechargeable battery of the present embodiment, the dispersibility and adhesiveness of the electrode active material and the conductive substance are high, and thus it is possible to realize a high-output lithium-ion rechargeable battery.

According to the method for manufacturing an electrode material for a lithium-ion rechargeable battery of the present embodiment, it is possible to obtain an electrode material for a lithium-ion rechargeable battery having high dispersibility and high adhesiveness of an electrode active material and a conductive substance.

EXAMPLES

Hereinafter, the present invention will be more specifically described using examples and comparative examples, but the present invention is not limited to the following examples.

Example 1

Synthesis of Electrode Material for Lithium-Ion Rechargeable Battery $LiFePO_4$ was synthesized in the following manner.

$Li_3PO_4$ was used as a Li source and a P source, $FeSO_4$ was used as a Fe source, and these components were mixed together so that the molar ratio therebetween reached Li:Fe:P=3:1:1, thereby preparing 250 ml of raw material slurry α.

Next, this raw material slurry α was put into a pressure resistant vessel.

After that, a heating reaction was performed on this raw material slurry α at 195° C. for three hours, thereby carrying out hydrothermal synthesis.

After the reaction, the atmosphere in the pressure resistant vessel was cooled to room temperature, thereby obtaining a cake-state precipitate of a reaction product.

This precipitate was sufficiently washed with distilled water a plurality of times, and the water content ratio thereof was maintained at 40% so as to prevent the precipitate from being dried, thereby producing a cake-form substance (electrode active material).

This cake-form substance was vacuum-dried at 70° C. for two hours, raw material slurry β obtained by dispersing, relative to 95% by mass of the obtained powder (particles), 2% by weight in terms of the amount of a solid solution of a water dispersible phenol resin as an aromatic organic compound and 3% by weight of lactose as an organic compound which had a weight-average molecular weight of 500 or less and did not include any aromatic groups in a water solvent was dried and granulated, and then a thermal treatment was carried out at 735° C. for two hours. Therefore, the surfaces of the particles were coated with a carbonaceous film, and an electrode material for a lithium-ion rechargeable battery of Example 1 was obtained.

Example 2

Synthesis of Electrode Material for a Lithium-Ion Rechargeable Battery

An electrode material for a lithium-ion rechargeable battery of Example 2 was obtained in the same manner as in Example 1 except for the fact that sucrose was used as the organic compound which had a weight-average molecular weight of 500 or less and did not include any aromatic groups.

Example 3

Synthesis of Electrode Material for a Lithium-Ion Rechargeable Battery

An electrode material for a lithium-ion rechargeable battery of Example 3 was obtained in the same manner as in Example 1 except for the fact that benzoic acid was used as the aromatic organic compound.

Example 4

Synthesis of Electrode Material for a Lithium-Ion Rechargeable Battery $LiFe_{0.20}Mn_{0.75}M_{0.05}PO_4$ was synthesized in the following manner.

$Li_3PO_4$ was used as a Li source and a P source, a $FeSO_4$ aqueous solution was used as a Fe source, a $MnSO_4$ aqueous solution was used as an Mn source, a $MgSO_4$ aqueous solution was used as an Mg source, and these components were mixed together so that the molar ratio therebetween reached Li:Fe:Mn:Mg:P=3:0.2:0.75:0.05:1, thereby preparing 250 ml of raw material slurry α.

Hereinafter, an electrode material for a lithium-ion rechargeable battery of Example 4 was obtained in the same manner as in Example 1.

Example 5

Synthesis of Electrode Material for a Lithium-Ion Rechargeable Battery $LiFe_{0.20}Mn_{0.75}Co_{0.02}Mg_{0.03}PO_4$ was synthesized in the following manner.

$Li_3PO_4$ was used as a Li source and a P source, a $FeSO_4$ aqueous solution was used as a Fe source, a $MnSO_4$ aqueous solution was used as an Mn source, a $CoSO_4$ aqueous solution was used as a Co source, a $MgSO_4$ aqueous solution was used as an Mg source, and these components were mixed together so that the molar ratio therebetween reached Li:Fe:Mn:Co:Mg:P=3:0.2:0.75:0.02:0.03:1, thereby preparing 250 ml of raw material slurry α.

Hereinafter, an electrode material for a lithium-ion rechargeable battery of Example 5 was obtained in the same manner as in Example 1.

Example 6

Synthesis of Electrode Material for a Lithium-Ion Rechargeable Battery $LiFe_{0.20}Mn_{0.75}Zn_{0.02}Mg_{0.03}PO_4$ was synthesized in the following manner.

$Li_3PO_4$ was used as a Li source and a P source, a FeSO4 aqueous solution was used as a Fe source, a $MnSO_4$ aqueous solution was used as an Mn source, a $ZnSO_4$ aqueous solution was used as a Zn source, a $MgSO_4$ aqueous solution was used as an Mg source, and these components were mixed together so that the molar ratio therebetween reached Li:Fe:Mn:Zn:Mg:P=3:0.2:0.75:0.02:0.03:1, thereby preparing 250 ml of raw material slurry α.

Hereinafter, an electrode material for a lithium-ion rechargeable battery of Example 6 was obtained in the same manner as in Example 1.

Example 7

Synthesis of Electrode Material for a Lithium-Ion Rechargeable Battery $LiFe_{0.20}Mn_{0.75}Co_{0.0198}Mg_{0.03}Ca_{0.0002}PO_4$ was synthesized in the following manner.

Li3PO4 was used as a Li source and a P source, a $FeSO_4$ aqueous solution was used as a Fe source, a $MnSO_4$ aqueous solution was used as an Mn source, a $CoSO_4$ aqueous solution was used as a Co source, a $MgSO_4$ aqueous solution was used as an Mg source, a $Ca(OH)_2$ aqueous solution was used as a Ca source, and these components were mixed together so that the molar ratio therebetween reached Li:Fe:Mn:Co:Mg:P=3:0.2:0.75:0.0198:0.03:0.0002:1, thereby preparing 250 ml of raw material slurry α.

Hereinafter, an electrode material for a lithium-ion rechargeable battery of Example 7 was obtained in the same manner as in Example 1.

Comparative Example 1

Synthesis of Electrode Material for a Lithium-Ion Rechargeable Battery

An electrode material for a lithium-ion rechargeable battery of Comparative Example 1 was obtained in the same manner as in Example 1 except for the fact that the organic compound which had a weight-average molecular weight of 500 or less and did not include any aromatic groups was not used.

Comparative Example 2

Synthesis of Electrode Material for a Lithium-Ion Rechargeable Battery

An electrode material for a lithium-ion rechargeable battery of Comparative Example 2 was obtained in the same manner as in Example 1 except for the fact that the aromatic organic compound was not used.

Comparative Example 3

Synthesis of Electrode Material for a Lithium-Ion Rechargeable Battery

An electrode material for a lithium-ion rechargeable battery of Comparative Example 3 was obtained in the same manner as in Example 1 except for the fact that the aromatic organic compound was not used, and amylose was used as the organic compound which had a weight-average molecular weight of 500 or less and did not include any aromatic groups.

Evaluation of Electrode Material for Lithium-Ion Rechargeable Battery (1) Specific Surface Area The specific surface areas of the electrode materials for a lithium-ion rechargeable battery of the examples and the comparative examples were measured using a specific surface area meter (trade name: BELSORP-mini, manufactured by MicrotracBEL Corp.) and a BET method in which nitrogen ($N_2$) adsorption was used. The evaluation results are shown in Table 1.

(2) Amount of Carbon

The amounts of carbon in the electrode materials for a lithium-ion rechargeable battery of the examples and the comparative examples were measured using a carbon analyzer (trade name: EMIA-220V, manufactured by Horiba Ltd.). The evaluation results are shown in Table 1.

(3) Average Primary Particle Diameter

The electrode material for a lithium-ion rechargeable battery was observed using a scanning electron microscope (SEM) (trade name: S-4800, manufactured by Hitachi High-Technologies Corporation), and the average primary particle diameters of the electrode materials for a lithium-ion rechargeable battery of the examples and the comparative examples were obtained from the obtained scanning electron microscopic images. The evaluation results are shown in Table 1.

(4) Particle Size Distribution (D10, D90)

The particle size distributions (the particle diameter (D10) obtained when the cumulative volume percentage of the particle size distribution of the secondary particles was 10% and the particle diameter (D90) obtained when the cumulative volume percentage of the particle size distribution of the secondary particles was 90%) of the electrode material were measured using a laser diffraction/scattering particle size distribution measurement instrument (manufactured by Horiba, Ltd., trade name: LA-950).

(5) Angle of Repose

The angle of repose of the electrode material for a lithium-ion rechargeable battery was measured using the method described in Japanese Industrial Standards JIS R9301-2-2:1999 "Alumina powder—Part 2: Determination of physical properties—2: Angle of repose".

Production of Lithium-Ion Rechargeable Battery

The electrode material for a lithium-ion rechargeable battery of each of the examples and the comparative examples, polyvinylidene fluoride (PVdF) as a binding agent, and acetylene black (AB) as a conductive auxiliary agent were added to N-methyl-2-pyrrolidone (NMP) which was a solvent so that the mass ratio therebetween in a paste reached electrode material:AB:PVdF=90:5:5, and the components were mixed together, thereby preparing the paste of an electrode material for a lithium-ion rechargeable battery.

Next, the paste of an electrode material for a lithium-ion rechargeable battery was applied to a surface of a 30 µm-thick aluminum foil (current collector) so as to form a coating, and the coating was dried, thereby forming an electrode mixture layer on the surface of the aluminum foil. After that, the electrode mixture layer was pressed under a predetermined pressure so as to obtain a predetermined density, thereby producing a cathode for a lithium-ion rechargeable battery of each of the examples and the comparative examples.

Next, a circular plate having a diameter of 16 mm was produced from the cathode for a lithium-ion rechargeable battery using a shaping machine by means of punching, was vacuum-dried, and then a lithium-ion rechargeable battery of each of the examples and the comparative examples was produced using a stainless steel (SUS) 2016 coil cell in a dried argon atmosphere.

Metallic lithium was used as an anode, a porous polypropylene film was used as a separator, and a $LiPF_6$ solution (1 M) was used as an electrolytic solution. As the $LiPF_6$ solution, a solution obtained by mixing ethylene carbonate and ethyl methyl carbonate so that the volume ratio therebetween reached 1:1 was used.

Evaluation of Lithium-Ion Rechargeable Battery (1) Battery Characteristics

The battery characteristics of the lithium-ion rechargeable battery were evaluated. At an environmental temperature of 25° C., constant electric current charge was carried out at an electric current value of 0.1 CA until the voltage of the cathode reached 4.3 V relative to the equilibrium voltage of Li, and, once the voltage reached 4.3 V, constant voltage charge was carried out until the electric current value reached 0.01 CA.

After that, the lithium-ion rechargeable battery was rested for one minute, and then, at an environmental temperature of 25° C., constant electric current discharge of 3 CA was carried out until the voltage of the cathode reached 2.0 V relative to the equilibrium voltage of Li. The discharge capacity of the lithium-ion rechargeable battery was evaluated by means of this test. The results are shown in Table 1.

TABLE 1

| No. | Active material | Carbon source 1 | Carbon source 2 | Specific surface area [m²/g] | Amount of carbon [wt. %] | Average primary particle diameter [nm] |
|---|---|---|---|---|---|---|
| Example 1 | $LiFePO_4$ | Water-dispersible phenol resin | Lactose | 11.0 | 1.05 | 354 |
| Example 2 | $LiFePO_4$ | Water-dispersible phenol resin | Sucrose | 9.8 | 0.99 | 337 |
| Example 3 | $LiFePO_4$ | Benzoic acid | Lactose | 9.3 | 1.06 | 371 |
| Example 4 | $LiFe_{0.20}Mn_{0.75}Mg_{0.05}PO_4$ | Water-dispersible phenol resin | Lactose | 13.2 | 1.04 | 84 |
| Example 5 | $LiFe_{0.20}Mn_{0.75}Co_{0.02}Mg_{0.03}PO_4$ | Water-dispersible phenol resin | Lactose | 11.9 | 1.09 | 218 |

TABLE 1-continued

| | Active material | | | d10 [μm] | d90 [μm] | Angle of repose [°] | Volume resistance [Ω · cm] | 3CA discharge capacity [mAh/g] |
|---|---|---|---|---|---|---|---|---|
| Example 6 | LiFe$_{0.20}$Mn$_{0.75}$Zn$_{0.02}$Mg$_{0.03}$PO$_4$ | Water-dispersible phenol resin | Lactose | 12.6 | 1.02 | | | 163 |
| Example 7 | LiFe$_{0.20}$Mn$_{0.75}$Co$_{0.0198}$Mn$_{0.03}$Ca$_{0.0002}$PO$_4$ | Water-dispersible phenol resin | Lactose | 12.4 | 1.05 | | | 192 |
| Comparative Example 1 | LiFePO$_4$ | Water-dispersible phenol resin | None | 10.5 | 1.10 | | | 311 |
| Comparative Example 2 | LiFePO$_4$ | None | Lactose | 11.3 | 1.04 | | | 298 |
| Comparative Example 3 | LiFePO$_4$ | amylose | Lactose | 9.7 | 1.08 | | | 345 |
| Comparative Example 4 | LiFePO$_4$ | Water-dispersible phenol resin | Polyacrylic acid | 10.4 | 0.99 | | | 322 |

| No. | Active material | d10 [μm] | d90 [μm] | Angle of repose [°] | Volume resistance [Ω · cm] | 3CA discharge capacity [mAh/g] |
|---|---|---|---|---|---|---|
| Example 1 | LiFePO$_4$ | 1.54 | 9.43 | 44 | 78 | 137 |
| Example 2 | LiFePO$_4$ | 2.35 | 12.56 | 48 | 145 | 141 |
| Example 3 | LiFePO$_4$ | 1.98 | 17.13 | 39 | 194 | 134 |
| Example 4 | LiFe$_{0.20}$Mn$_{0.75}$Mg$_{0.05}$PO$_4$ | 1.56 | 16.32 | 42 | 2185 | 135 |
| Example 5 | LiFe$_{0.20}$Mn$_{0.75}$Co$_{0.02}$Mg$_{0.03}$PO$_4$ | 2.18 | 12.46 | 46 | 1992 | 138 |
| Example 6 | LiFe$_{0.20}$Mn$_{0.75}$Zn$_{0.02}$Mg$_{0.03}$PO$_4$ | 1.77 | 9.65 | 45 | 1762 | 133 |
| Example 7 | LiFe$_{0.20}$Mn$_{0.75}$Co$_{0.0198}$Mn$_{0.03}$Ca$_{0.0002}$PO$_4$ | 2.16 | 13.89 | 49 | 2262 | 136 |
| Comparative Example 1 | LiFePO$_4$ | 3.65 | 19.43 | 34 | 42 | 125 |
| Comparative Example 2 | LiFePO$_4$ | 0.83 | 7.43 | 53 | 683 | 123 |
| Comparative Example 3 | LiFePO$_4$ | 4.23 | 20.67 | 55 | 431 | 116 |
| Comparative Example 4 | LiFePO$_4$ | 0.68 | 6.34 | 31 | 69 | 127 |

It was found from the results in Table 1 that, in the electrode materials for a lithium-ion rechargeable battery of Examples 1 to 7, the angle of repose was in a range of 35° or more and 50° or less, and thus the discharge capacity at an electric current density of 3 CA was 130 mAh/g or more.

On the other hand, it was found that, in the electrode materials for a lithium-ion rechargeable battery of Comparative Examples 1 to 4, the angle of repose was less than 35° and more than 50°, and thus the discharge capacity at an electric current density of 3 CA was less than 130 mAh/g.

The electrode material for a lithium-ion rechargeable battery of the present invention is an electrode material for a lithium-ion rechargeable battery formed by coating a surface of an electrode active material represented by General Formula LiFe$_x$Mn$_{1-x-y}$M$_y$PO$_4$ (here, M represents at least one element selected from Mg, Ca, Co, Sr, Ba, Ti, Zn, B, Al, Ga, In, Si, Ge, and rare earth elements, 0.05≤x≤1.0, 0≤y≤0.14) with a carbonaceous film, and the angle of repose is in a range of 35° or more and 50° or less, and thus a lithium-ion rechargeable battery including an electrode for a lithium-ion rechargeable battery produced using this electrode material for a lithium-ion rechargeable battery has a high discharge capacity and thus can also be applied to a next-generation rechargeable battery from which a higher voltage, a higher energy density, higher load characteristics, and higher-speed charge and discharge characteristics are expected. In the case of a next-generation rechargeable battery, the effects are extremely strong.

What is claimed is:

1. An electrode material for a lithium-ion rechargeable battery, comprising:
   agglomerates of LiFePO$_4$ primary particles, coated with a calcinated carbonaceous film having a thickness of 1 nm to 5 nm, and an angle of repose in a range of 35° to 50°.

2. The electrode material for a lithium-ion rechargeable battery according to claim 1,
   wherein an average primary particle diameter of the primary particles is in a range of 30 nm or more and 500 nm or less; and wherein when a cumulative volume percentage of a particle size distribution of the agglomerates is 10%, a particle diameter (D10) is in a range of 1 μm or more and 3 μm or less; and, when the cumulative volume percentage of the particle size distribution of the agglomerates is 90%, the particle diameter (D90) is in a range of 6 μm or more and 18 μm or less.

3. The electrode material for a lithium-ion rechargeable battery according to claim 1,
   wherein a discharge capacity of the LiFePO$_4$ at an electric current density of 3 CA is 130 mAh/g or more.

4. A method for manufacturing an electrode material for a lithium-ion rechargeable battery according to claim 1, comprising:
- a step of preparing a mixture made up of the electrode active material, an aromatic organic compound as a first carbon source material, and an organic compound which has a weight-average molecular weight of 500 or less and does not include any aromatic groups as a second carbon source material;
- a step of obtaining an agglomerate by spraying and drying the mixture; and
- a step of calcinating the agglomerate.

5. The electrode material for a lithium-ion rechargeable battery according to claim 1, wherein the angle of repose ranges from more than 35° to 50° or less.

* * * * *